US009936023B2

(12) United States Patent
Vajravel et al.

(10) Patent No.: US 9,936,023 B2
(45) Date of Patent: Apr. 3, 2018

(54) SYSTEM AND METHOD TO ATTACH A LOCAL FILE SYSTEM TO A REMOTE DISK STACK

(71) Applicant: Dell Products L.P., Round Rock, TX (US)

(72) Inventors: Gokul T. Vajravel, Bangalore (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 14/846,353

(22) Filed: Sep. 4, 2015

(65) Prior Publication Data

US 2017/0068462 A1 Mar. 9, 2017

(51) Int. Cl.
*G06F 3/06* (2006.01)
*H04L 29/08* (2006.01)
*G06F 17/30* (2006.01)

(52) U.S. Cl.
CPC .......... *H04L 67/1097* (2013.01); *G06F 3/067* (2013.01); *G06F 3/0607* (2013.01); *G06F 3/0632* (2013.01); *G06F 3/0664* (2013.01); *G06F 17/30067* (2013.01); *H04L 67/06* (2013.01); *H04L 67/2842* (2013.01)

(58) Field of Classification Search
CPC .................. H04L 67/1097; H04L 67/2842
See application file for complete search history.

(56) References Cited

U.S. PATENT DOCUMENTS

| 5,778,384 | A | * | 7/1998 | Provino | ............ | G06F 17/30233 |
| 8,010,630 | B2 | | 8/2011 | Barreto et al. | | |
| 8,510,505 | B1 | * | 8/2013 | van Reitschote | . | G06F 17/30233 |
| | | | | | | 707/610 |
| 2007/0011374 | A1 | * | 1/2007 | Kumar | .................. | G06F 9/4411 |
| | | | | | | 710/105 |
| 2009/0222453 | A1 | * | 9/2009 | Naineni | ............ | G06F 17/30132 |
| 2016/0127492 | A1 | * | 5/2016 | Malwankar | ......... | H04L 67/2842 |
| | | | | | | 709/212 |

* cited by examiner

*Primary Examiner* — Edward J Dudek, Jr.
(74) *Attorney, Agent, or Firm* — Baker Botts L.L.P.

(57) ABSTRACT

In certain information handling system environments, storage devices connected to a client are redirected to a server or other information handling system. To increase efficiency and reduce costs, the server may mount a file system on top of the redirected storage device. Mounting the file system permits the redirected storage device to cache data associated with the storage device of a client. Requests from applications to read data or to write data to the storage device may be handled completely at the server by accessing the file system cache at the server.

20 Claims, 7 Drawing Sheets

SYSTEM AND METHOD TO ATTACH A LOCAL FILE SYSTEM TO A REMOTE DISK STACK

TECHNICAL FIELD

This disclosure generally relates to attaching a local file system to a remote disk stack for improving response time of requests to/from a remote disk, such as a universal serial bus (USB) mass storage device, that has been redirected.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

In general, an operating system (OS), such as Windows, caches file data that is read from and written to a local storage device, such as a USB mass storage device. When a later read or write request is made the file data may be read from or written to a system memory known as a system file cache rather than directly to the local storage device. In VDI environments, the local storage device may be used at a remote server by drive-mapping; the local storage device is made available to the remote server as a network drive. For optimal performance, these mapped drives require caching servers at least one per branch or local site. Also, each drive mapping technology may apply its own particular caching mechanisms. Each different caching server may require separate hardware (which may be complex and/or expensive) and its own configuration and some may not support caching for redirected storage devices. Further, delays may result from utilization of a caching server that makes the system inefficient. The present disclosure provides systems and methods to address this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
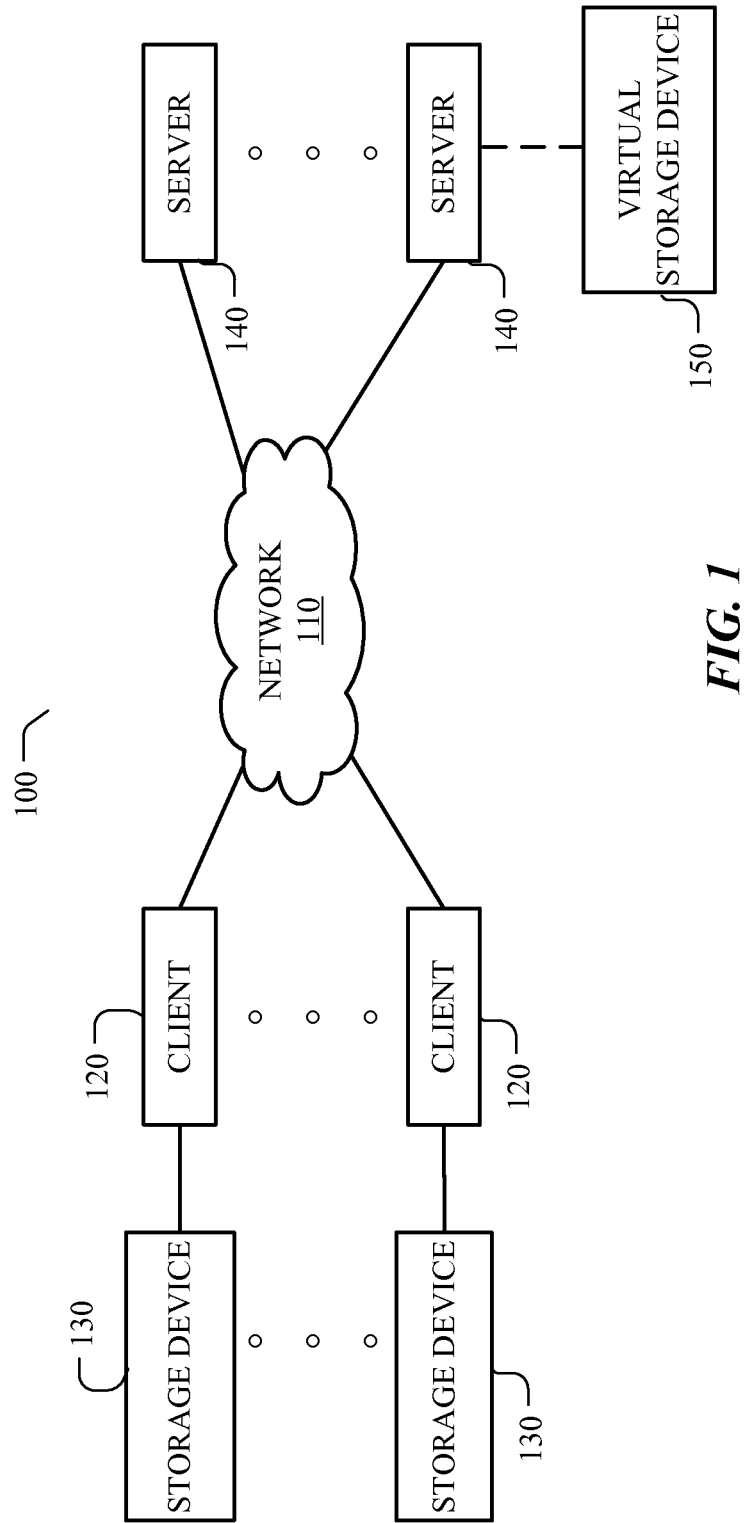
FIG. 1 illustrates an example configuration of networked information handling systems according to one embodiment of the present disclosure.

This disclosure generally relates to attaching the local file system associated with a storage device, such as a universal serial bus (USB) mass storage device, hard disk drive (HDD), small computer system interface SCSI drive, serial SATA (Serial ATA or Serial AT Attachment) drive or any other storage device known to one of ordinary skill in the art to a remote disk stack associated with the redirected storage device. In a typical information handling system, caching occurs under the direction of a cache manager which operates continuously while the operating system (OS) such as Windows is running File data in the system file cache is written to a disk or storage device, such as a mass storage device, at intervals determined by the OS and the memory previously used by that file data is freed. This may be referred to as flushing the system file cache. The time at which a block of file data is flushed is based, at least in part, on the amount of time the file data has been stored in the system file cache and the amount of time since the file data was last accessed in a read operation. This ensures that the file data that is frequently read will stay accessible in the system file cache for the maximum amount of time.

However, when a storage device is made available to a remote server via drive mapping, the mapped drive(s) requires a caching server, at least one per branch or local site. The increase in costs associated with additional hardware, maintenance and configurations along with performance issues (for example, increased delays performing a transaction) may make such drive mapping of a local storage device unworkable. Such issues may be addressed by creating a system file cache at the remote server to handle the caching needs of a redirected storage device without the requirement of additional hardware reducing delay and expense of the system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive (HDD) or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple users may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to universal serial bus (USB) printers, scanners, USB storage devices, HDDs and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a storage device, for example, a USB storage device, is connected to a given client via a standard connection, the locally connected storage device may be redirected to the server. The redirected storage device may then be installed locally for use by any number of clients. The server treats the storage device as a virtual storage device attached to the server.

FIG. 1 at 100 illustrates an example configuration of a networked information handling system. In particular embodiments, one or more client devices 120 and one or more servers 140 are connected via network 110. Network 110 may be a WAN, local-area network (LAN) or any other type of network known to one of ordinary skill in the art. Many types of peripheral devices may be connected locally to the client devices 120. As shown in FIG. 1, in some embodiments, one or more devices 130 connect to the client devices 120. According to the present disclosure, one or more storage devices 130 may appear to one or more of servers 140 as if they are locally installed on and connected to those servers 140. In certain embodiments, these storage devices 130 may be redirected such that they appear to be locally installed or locally shared with another client device 120. In one embodiment, the Dell Wyse TCX USB Virtualization is used to virtualize a storage device 130. In one or more embodiments, one or more storage devices 130 may be virtualized as virtual storage device 150 at a server 140.

Figure 2:
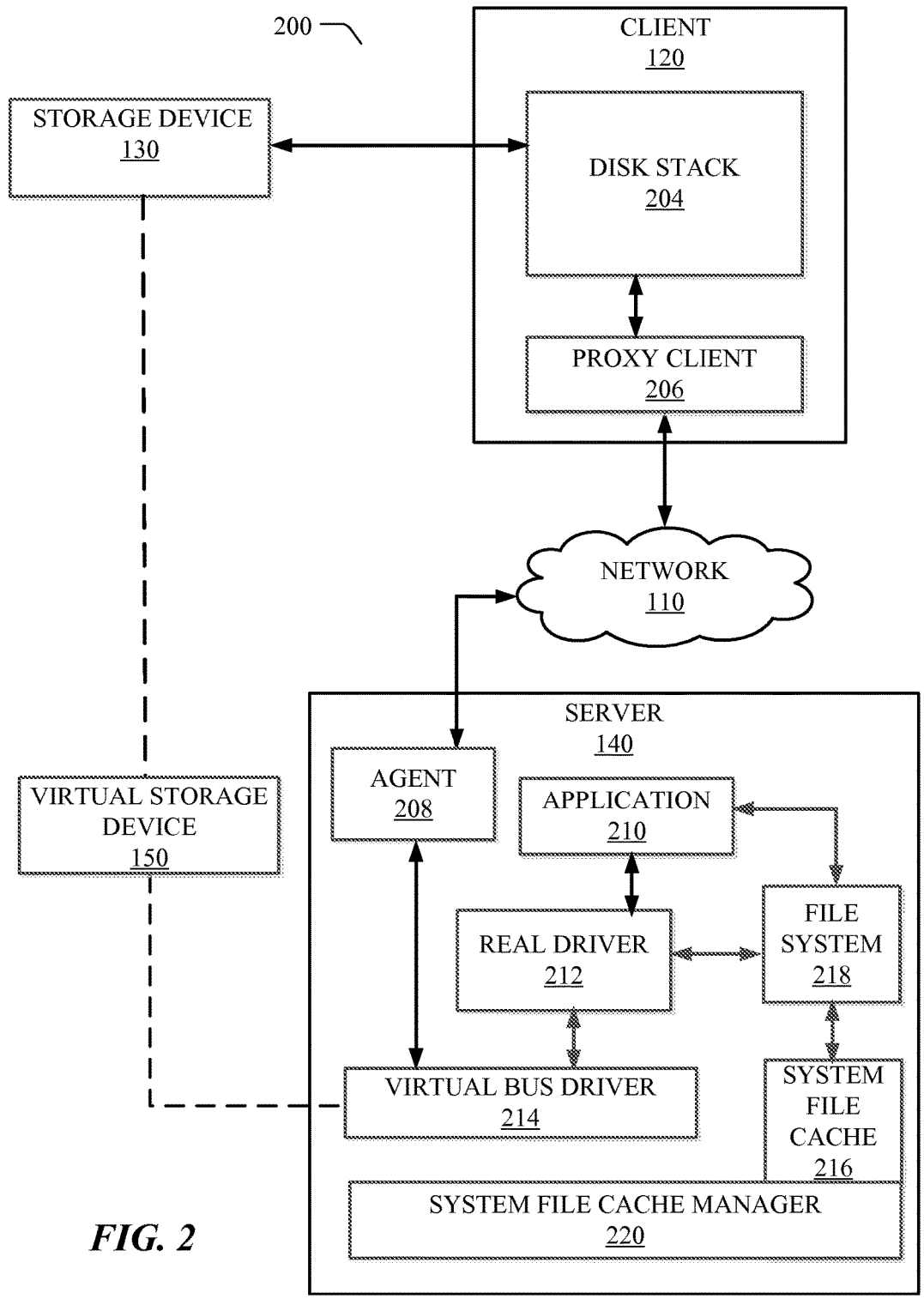
FIG. 2 illustrates an example system of a networked client and server according to one embodiment of the present disclosure.

FIG. 2 at 200 illustrates an example embodiment of a system configured to redirect a storage device 130, for example, a USB storage device such as a USB hard disk drive or any other type of storage device known to one of ordinary skill in the art. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

In particular embodiments, client 120 connects to server 140 via network 110. In one embodiment, network 110 may be a WAN network. In other embodiments, network 110 may be a LAN network or any other type of network known to one of ordinary skill in the art. Network 110 may be a high latency network.

When a storage device 130 is initially connected to client 120, client 120 may attempt to initialize the storage device 130 by attempting to load a disk stack 204. According to the present disclosure, client 120 may determine (or may permit a user to determine) whether to redirect storage device 130 upon connection of the storage device 130, as part of the initialization of storage device 130. In particular embodiments, client 120 may make a new determination regarding the installation of storage device 130 after storage device 130 has been initialized. For example, a user may decide that the storage device 130 that was previously installed on its local client 120 should be redirected to server 140. Client 120 may be configured to automatically install all or only certain storage devices 130 locally, may be configured to automatically redirect all or certain storage devices 130 to server 140, or may be configured to request input from a user of client 120 or from another source to determine whether to install a particular storage device 130 locally or to redirect it.

If a storage device 130 is configured to be redirected to server 140, the redirection may operate generally as described in U.S. Pat. No. 8,010,630 to Barreto, et al., which is incorporated herein by reference. A proxy client 206 on client 120 may coordinate communications between storage device 130 and an agent 208 running on server 140. In particular proxy client 208 may be configured to receive socket connection information from server 140 and initiate redirecting I/O transactions between storage device 130 and agent 208. Agent 208 may be configured to register with the OS of server 140 to receive notification of an establishment of any remote access connection. In one embodiment, proxy client 206 may be configured to receive socket connection information from agent 208 of server 140 and initiate redirecting I/O transactions to and from storage device 130 to agent 208 on server 140.

Virtual bus driver 214 receives information about storage device 130 that is to be redirected from agent 208. Virtual bus driver 214 may be a Wyse virtual USB bus driver wvusbbus.sys, for example. Virtual bus driver 214 calls real driver 212 associated with the virtual storage device 150, to complete the initialization of the virtual storage device 150 on server 140. Based on the storage device type enumerated by the virtual bus driver 214, the appropriate OS stack will be created. The I/O transactions will reach the bottom of the OS stack which is the virtual bus driver 214. The virtual bus driver 214 and, for example, along with an auxiliary server, transfers these I/O transactions to the client 120 via the agent 208 on the server 140 and the proxy client 206 on the client 120.

The virtual storage device 150 associated with the storage device 130 then functions as if the storage device 130 was locally connected to server 140 (as indicated by the dashed line between storage device 130 and virtual storage device 150). The virtual storage device 150 may thus be made available to application 210 running on server 140, which treats the virtual storage device 150 as a local device.

The application 210 may make requests to access one or more virtual storage devices 150. These requests are translated as transaction requests or URBs directed to the virtual storage device 150 at the server 140. The virtual bus driver 214 redirects the URBs to the client 120 where the associated storage device 130 is located. These requests from the server 140 are transmitted to the storage device 130 via a proxy client 206. The proxy client 206 transmits the requests to the storage device 130 via disk stack 204. The responses from the storage device 130 are transmitted back to the server 140 via agent 208 and pumped to the virtual bus driver 214. The virtual bus driver 214 passes the responses back to the respective applications 210 via the real driver 212. Application 210 may be one or more applications and may be one or more virtual applications.

The file system 218 is mounted on top of the virtual storage device 150 which allows the virtual storage device 150 to use the default OS file system caching. A system file cache 216 is created at the server 140 to handle the caching needs of a redirected storage device, such as virtual storage device 150. Transactions from application 210 related to reading data from the virtual storage device 150 may be handled by the system file cache 216 rather than issuing commands or redirecting the transactions to the storage device 130 via the virtual bus driver 214. Transactions from application 210 related to writing data to the virtual USB storage device 150 may also be handled by the system file cache 216 rather than redirecting them to the storage device 130 via the virtual bus driver 214. For example, the writing data is cached until a predetermined amount of data has been cached, a predetermined timer interval has passed or any combination thereof or in other manner known to one of ordinary skill in the art. The caching to the system file cache 216 occurs under the direction of the system file cache manager 220. The system file cache manager 220 operates continuously while the OS is running.

Figure 3:
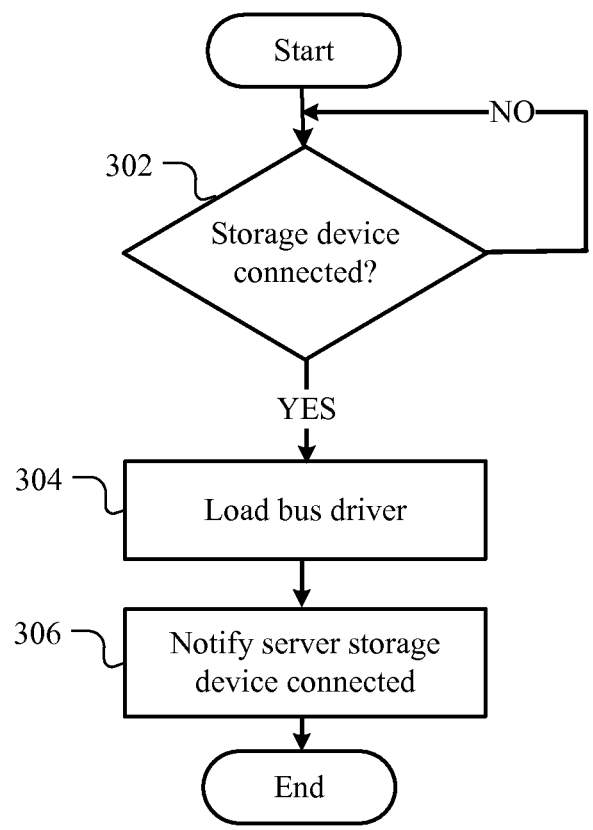
FIG. 3 illustrates an example of steps involved in one method according to one embodiment of the present disclosure.

FIG. 3 is a flow chart in accordance with an embodiment of the present disclosure, shown generally at 300, relating to redirecting a storage device 130 at client 120 to a server 140. At step 302, the client 120, via proxy client 206, polls to determine if a storage device 130 has been connected to client 120. Proxy client 206 may determine if a storage device 130 is connected by any process known to one of ordinary skill in the art. For example, in one embodiment a user may use a graphical user interface (GUI) to inform the client 120 that a storage device 130 has been connected. In another embodiment, the client 120 may automatically detect without user intervention the connection of a storage device 130. Storage device 130 may be any known storage device including, but not limited to, a USB thumb drive, a USB HDD or any other storage device known to one of ordinary skill in the art that can be coupled to the client 120. Client 120 may poll for a connection in any way known to one of ordinary skill in the art, including, but not limited, waiting on an interrupt, timer, semaphore, etc. that indicates connection of a storage device such as storage device 130.

At step 306, the client 120 notifies the server 140 that storage device 130 is connected to client 120. In one embodiment, the storage device 130 of client 120 sends a request via proxy client 206 to the server 140 via agent 208 to request that the server 140 create a virtual storage device 150 corresponding to the storage device 130. In another embodiment, the server 140 receives a device plug-in notification from the client 120 that storage device 130 has been connected to client 120. The server 140 may then determine if one or more applications 210 need access to the storage device 130 and if so the server 140 creates a virtual storage device corresponding to the storage device 130. In another embodiment, the server 140 automatically virtualizes the storage device 130 any time the server 140 receives a notification from a client 120 that a storage device 130 has been connected. In other embodiments, the server may only automatically redirect the storage device 130 upon notification if the storage device 130 is determined to be of a predetermined type based on one or more of the one or more parameters received along with the device plug-in notification. For example, the type may be a USB thumb drive, USB HDD, or any other type of storage device known to one of ordinary skill in the art. The predetermined type may be stored as a setting in memory, set via a GUI, or any other way known to one of ordinary skill in the art. In another embodiment, the server 140 may only redirect the storage device 130 when requested by an application 210. Redirection of storage device 130 may further be redirected according to any other ways, processes or methods known to one of ordinary skill in the art.

Figure 4:
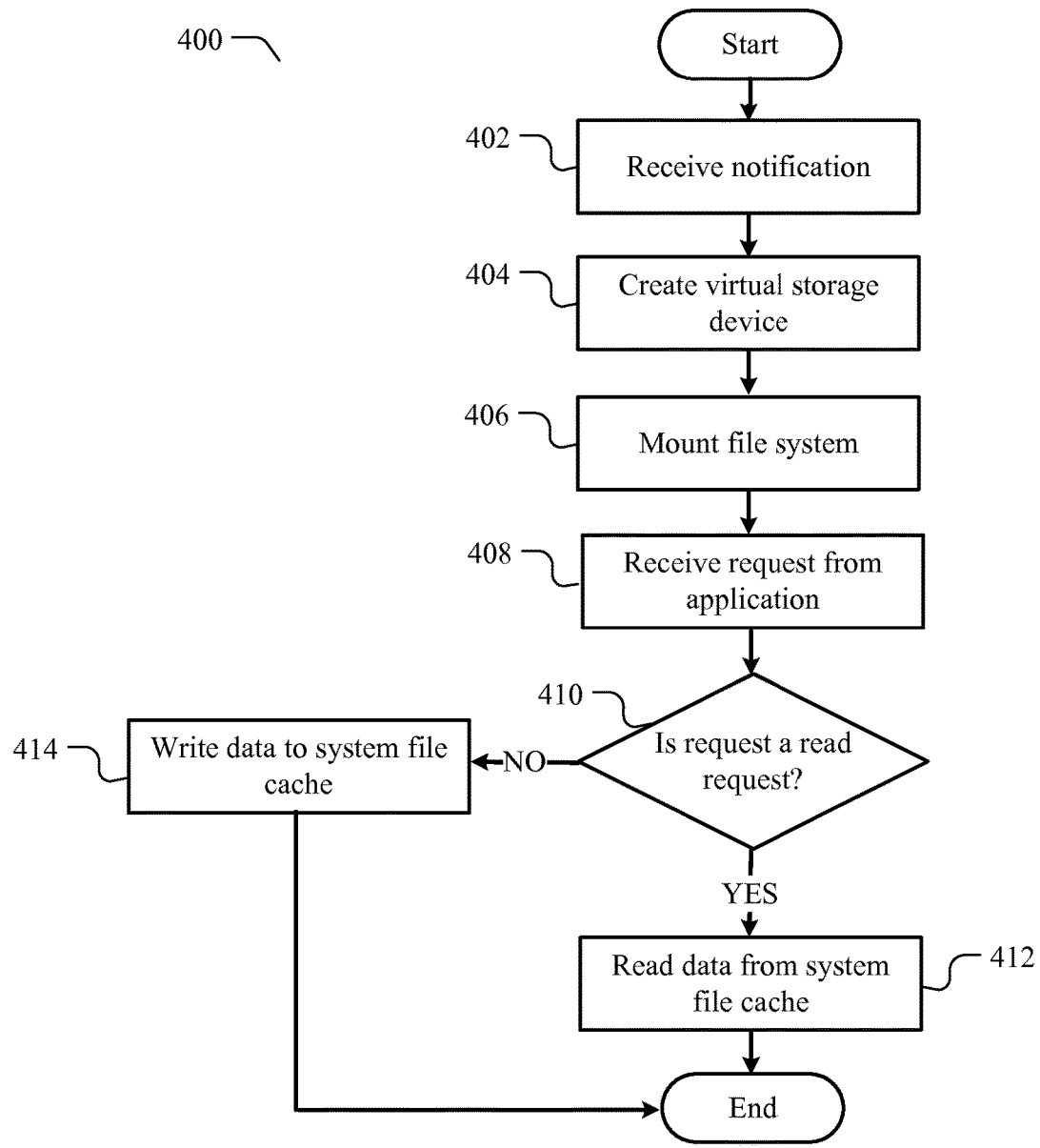
FIG. 4 illustrates an example of steps involved in one method according to one embodiment of the present disclosure.

FIG. 4 is a flow chart in accordance with one embodiment of the present invention shown generally at 400. At step 402, the server 140 receives a notification (for example, a device plug-in notification) from the client 120 that a storage device 130 is ready for virtualization such that it can be accessed from one or more applications 210. The notification is sent from the proxy client 206 to the agent 208. The notification may include information associated with the storage device 130, for example, one or more parameters. The one or more parameters may include serial number, device type, manufacturer identification number, and any other parameters known to one of ordinary skill in the art.

At step 404, the agent 208 issues a command, for example, an I/O control (IOCTL) command or any other such command known to one of ordinary skill in the art for the virtual bus driver 214 to create the virtual storage device 150. The virtual storage device 150 is created based, at least in part, on the notification, for example, the one or more parameters or any combination thereof. The virtual bus driver 214 advertises the device removal policy, for example, as 'orderly removal' to enable the system file cache 216. The virtual bus driver 214 calls the real driver 212 to complete the initialization of the virtual storage device 150.

At step 406, the file system 218 is mounted on top of the virtual storage device 150. The file system 218 will enable the system file cache 216. At step 408, the file system 218 receives a request from an application 210 to access the virtual storage device 150. At step 410, it is determined by the file system 218 if the request is a read request or a write request. If the request is a write request, not a read request, then at step 414 the data is written to the system file cache 216. If the request is a read request, then at step 412, the data is read from the system file cache 216. If the requested data is not available in the system file cache 216, the system file cache manager 220 will read the data from the virtual storage device 150 and will store the data in the system file cache 216. The request may be any type of I/O transaction, for example a URB. In one embodiment, a response is sent to the application 210, based, at least in part, on accessing the system file cache 216. In one embodiment, the request is handled completely at the server by at least accessing the system file cache 216 such that no transaction request need be sent to the storage device 130 on client 120.

Figure 5:
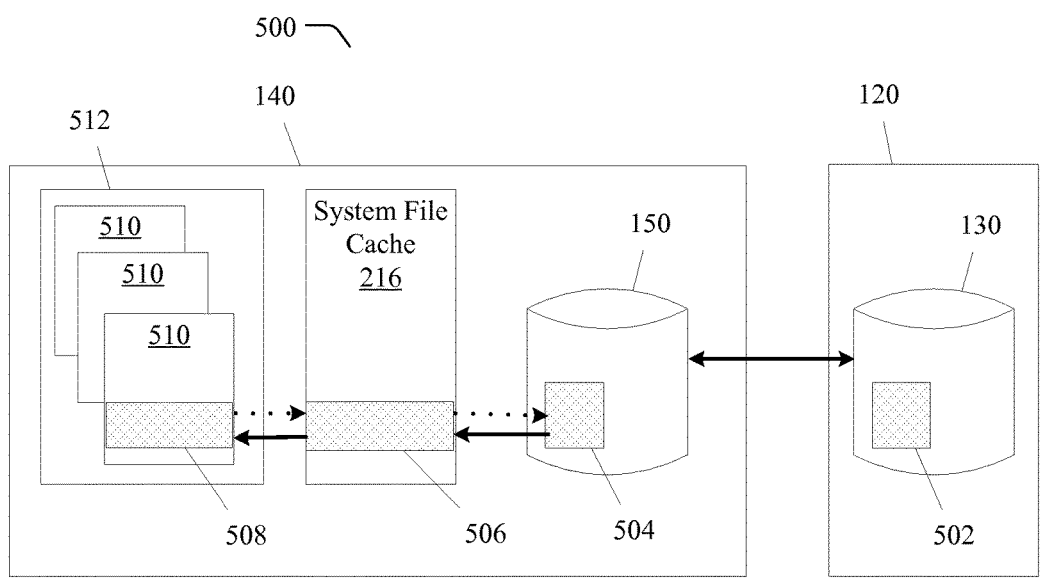
FIG. 5 illustrates an example remote cache system according to one embodiment of the present disclosure.

FIG. 5 illustrates an example remote cache system in accordance with one embodiment of the present invention shown generally at 500. In one embodiment a client 120 includes a storage device 130. The storage device 130 may include a data file 502. Storage device 130 may include any number of data files 502. Storage device 130 may be redirected to a server 140. The virtual storage device 150 (the storage device 130 that has been redirected) also has associated with it a data file 504 corresponding to data file 502. The data file 504 may be cached by the system file cache 216. Any number of data files 502 may be associated with a corresponding data file 504 of the system file cache 216. The system file cache 216 may cache all or any portion of a data file 504. The system file cache 216 is mounted on top of the virtual storage device 150. The system file cache 216 may be accessed by any one or more applications 510 in a set of applications 512 which are running in their own individual process address space. An application 510 may maintain an internal cache 508 associated with a cached data file 506.

The virtual storage device 150 at server 140 emulates the storage device 130 connected to the client 120. The virtual storage device 150 contains one or more data files 504. The file system 218 maintains a cache 506 for a data file 504 in the system file cache 216. Because the cache 506 memory is finite, the less used or referenced cache 506 may be removed so that new data file caches 506 may be added. System file cache manager 200 manages the caching including the removal of cache 506 for any reasons known to one of ordinary skill in the art, including, but not limited to, number of times accessed or used.

Figure 7:
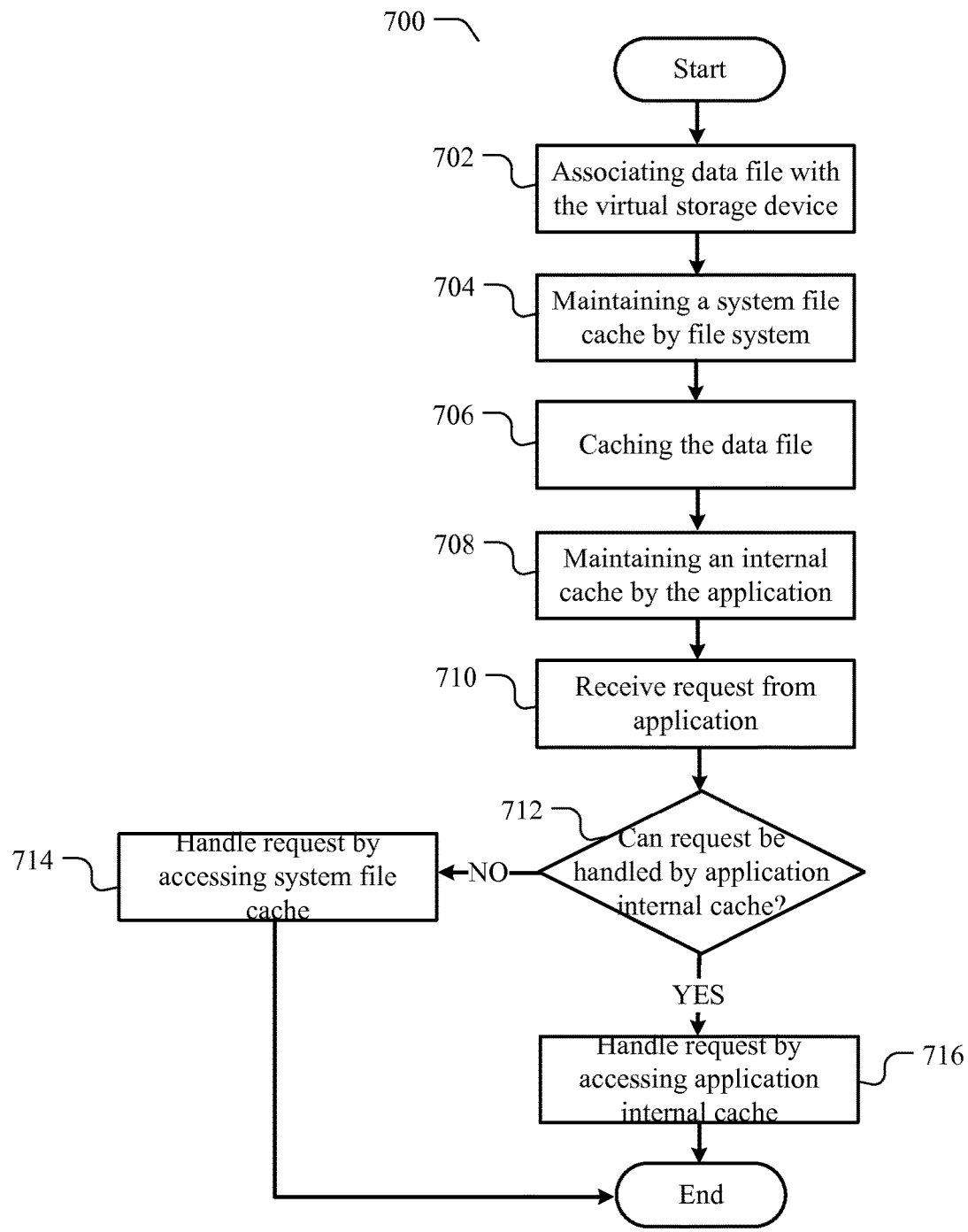
FIG. 7 illustrates an example of steps involved in one method according to one embodiment of the present disclosure.

FIG. 7 is a flow chart in accordance with one embodiment of the present invention shown generally at 700 related to caching and accessing a data file of a storage device 130 of client 120 that has been redirected as virtual storage device 150 at server 140. At step 702, a data file 504 that corresponds to a data file 502 of the storage device 130 is associated with the virtual storage device 150. At step 704, a system file cache 216 is maintained by a file system 218 associated with a virtual storage device 150. At step 706, the data file 504 of virtual storage device 150 is cached by the system file cache 216 as data file 506.

At step 708, an application 510 maintains an internal cache for storing one or more data files of virtual storage device 150 such as data file 504. At step 710, the virtual storage device 150 receives a request from an application 510. In one embodiment one or more applications 510 may send a request to virtual storage device 150.

At step 712, it is determined if the request can be handled by the internal cache of application 510. For example, it may be determined that cached data file 508 contains the information necessary to process the request. If the request can be handled by the internal cache, then at step 714 the request is handled by access the data file 508 from the internal cache of the application 510. If the request cannot be handled by the internal cache, then at step 716 the request is handled by accessing the data file 506 of the system file cache 216.

Figure 6:
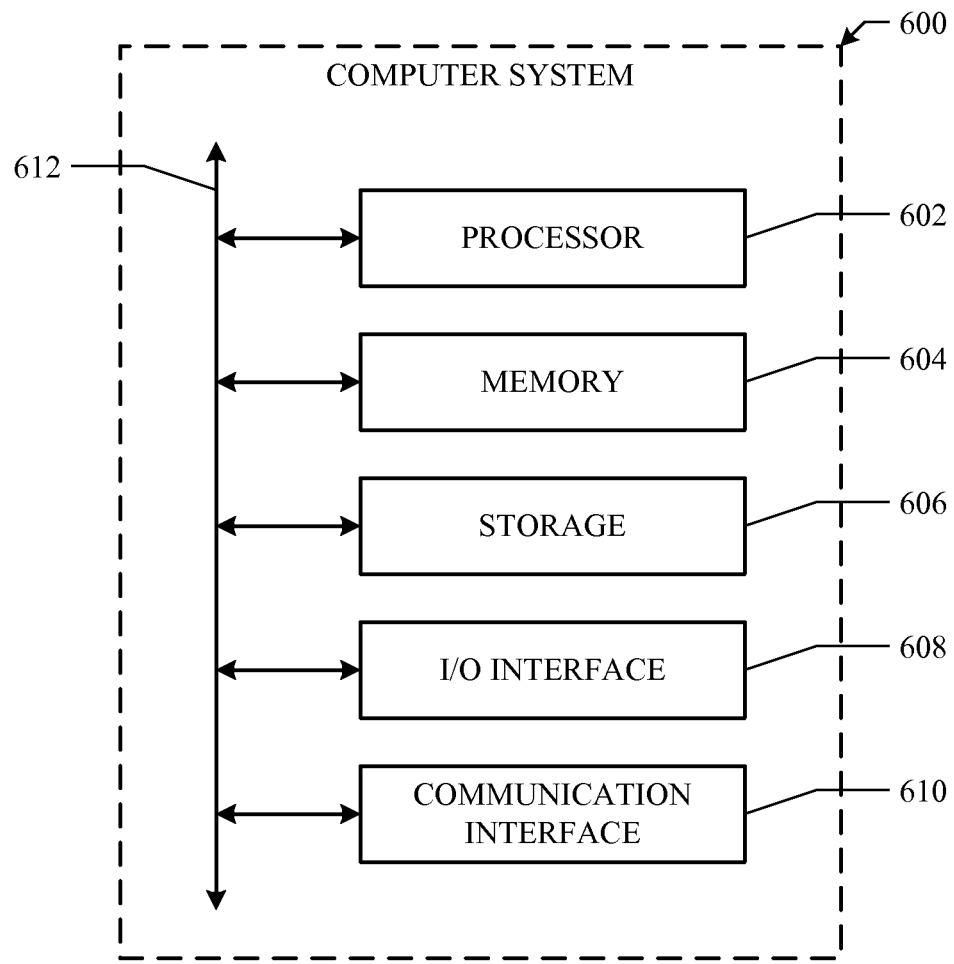
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The concepts disclosed in this application should not be understood to be limited to the exemplary embodiments described herein, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at an agent of a server, a notification from a proxy client of a client that a storage device has been connected to the client;
creating by a virtual bus driver of the server a virtual storage device of the server associated with the storage device;
mounting a file system on top of the virtual storage device, wherein mounting the file system allows the virtual storage device to use a default operating system file system caching of the server;
enabling a system file cache by the file system;
caching by the system file cache one or more data files associated with the storage device in a cache of the file system;
maintaining by an application of the server an internal cache, wherein the internal cache is associated with at least one of the one or more data files;
receiving by the file system a request from the application of the server to access the virtual storage device;
determining if the request can be handled by the internal cache of the application;
accessing the system file cache as part of processing the request; and
sending to the application a response based, at least in part, on accessing the system file cache.

2. The method of claim 1, wherein the system file cache caches at least a portion of the at least one of the one or more data files stored on the storage device.

3. The method of claim 1, further comprising:
calling by the virtual bus driver a real driver to complete initialization of the virtual storage device.

4. The method of claim 1, wherein the storage device comprises one of a USB thumb drive or a USB hard disk drive.

5. The method of claim 1, wherein the notification comprises at least one of a device type, a serial number, and a manufacturer identification number.

6. The method of claim 1, wherein the request from the application is a read request, and wherein data requested by the read request is read from the system file cache.

7. The method of claim 1, wherein the request from the application is a write request, and wherein data is written to the system file cache as requested by the write request.

8. A system comprising:
a first server;
one or more central processing units for processing information of the first server;
a memory of the first server communicatively coupled to the one or more central processing units; and
one or more modules that comprise instructions stored in the memory, the instructions, when executed by the one or more processing units, operable to perform operations comprising:
receiving, at an agent of the first server, a notification from a proxy client of a client that a storage device has been connected to the client;
creating by a virtual bus driver of the first server a virtual storage device of the first server associated with the storage device;
mounting a file system on top of the virtual storage device, wherein mounting the file system allows the virtual storage device to use a default operating system file system caching of the first server;
enabling a system file cache by the file system;
caching by the system file cache one or more data files associated with the storage device in a cache of the file system;
maintaining by an application of the server an internal cache, wherein the internal cache is associated with at least one of the one or more data files;
receiving by the file system a request from the application of the first server to access the virtual storage device;
determining if the request can be handled by the internal cache of the application;
accessing the system file cache as part of processing the request; and
sending to the application a response based, at least in part, on accessing the system file cache.

9. The system of claim 8, wherein the system file cache caches at least a portion of the at least one of the one or more data files stored on the storage device.

10. The system of claim 8, wherein the instructions further operable to perform operations comprising:
calling by the virtual bus driver a real driver to complete initialization of the virtual storage device.

11. The system of claim 8, wherein the storage device comprises one of a USB thumb drive or a USB hard disk drive.

12. The system of claim 8, wherein the notification comprises at least one of a device type, a serial number, and a manufacturer identification number.

13. The system of claim 8, wherein the request from the application is a read request, and wherein data requested by the read request is read from the system file cache.

14. The system of claim 12, wherein the request from the application is a write request, and wherein data is written to the system file cache as requested by the write request.

15. One or more computer-readable non-transitory storage media embodying software operable when executed by one or more computer systems to:
receive a notification from a proxy client of a client that a storage device has been connected to the client;
create by a virtual bus driver of a server of the one or more computer systems a virtual storage device of the server associated with the storage device;

mount a file system on top of the virtual storage device, wherein mounting the file system allows the virtual storage device to use a default operating system file system caching of the server;
enable a system file cache by the file system;
caching by the system file cache one or more data files associated with the storage device in a cache of the file system;
maintaining by an application an internal cache, wherein the internal cache is associated with at least one of the one or more data files;
receive by the file system a request from the application of the server to access the virtual storage device;
determining if the request can be handled by the internal cache of the application;
access the system file cache as part of processing the request; and
send to the application a response based, at least in part, on accessing the system file cache.

16. The media of claim 15, wherein the system file cache caches at least a portion of the at least one of the one or more data files stored on the storage device.

17. The media of claim 15, wherein the software is further operable when executed to:
call by the virtual bus driver a real driver to complete initialization of the virtual storage device.

18. The media of claim 15, wherein the storage device comprises one of a USB thumb drive or a USB hard disk drive.

19. The media of claim 15, wherein the request from the application is a read request, and wherein data requested by the read request is read from the system file cache.

20. The media of claim 15, wherein the request from the application is a write request, and wherein data is written to the system file cache as requested by the write request.

* * * * *